June 19, 1962 W. M. McCONNELL ET AL 3,039,584
ELONGATED ARTICLE HANDLING APPARATUS
Filed Sept. 7, 1961 7 Sheets-Sheet 1

INVENTORS.
William M. McConnell
William H. Bradley
Raymond L. Carey
Howard E. Chappell
BY Webb, Mackey & Burden
THEIR ATTORNEYS

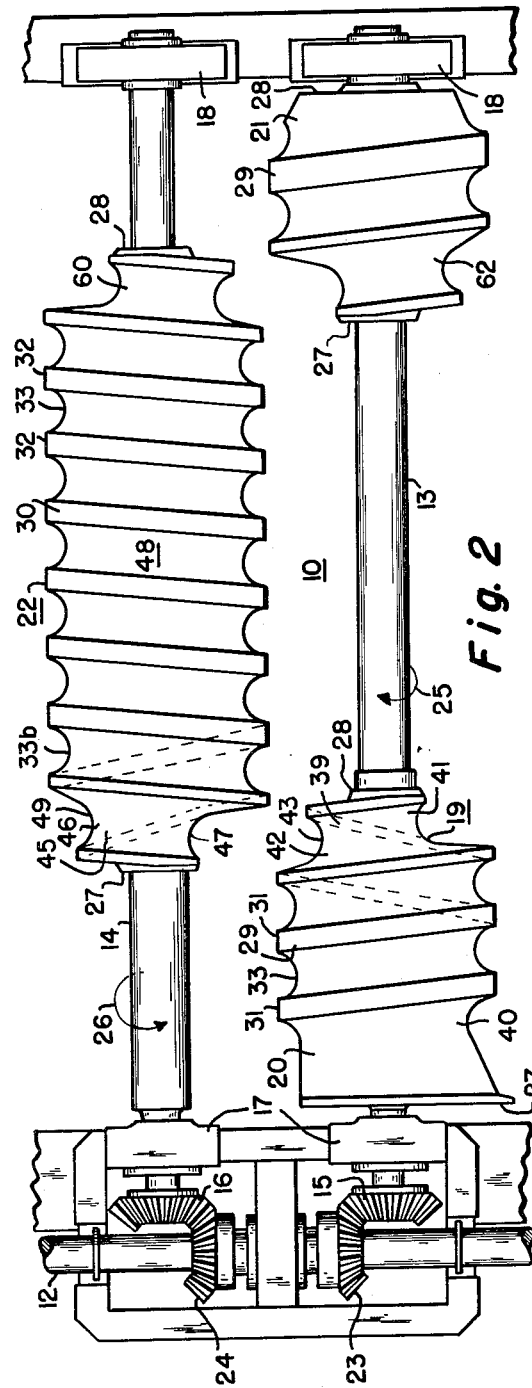

June 19, 1962 W. M. McCONNELL ETAL 3,039,584
ELONGATED ARTICLE HANDLING APPARATUS
Filed Sept. 7, 1961 7 Sheets-Sheet 4

INVENTORS.
William M. McConnell
William H. Bradley
Raymond L. Carey
Howard E. Chappell BY Webb, Mackey & Burden
THEIR ATTORNEYS

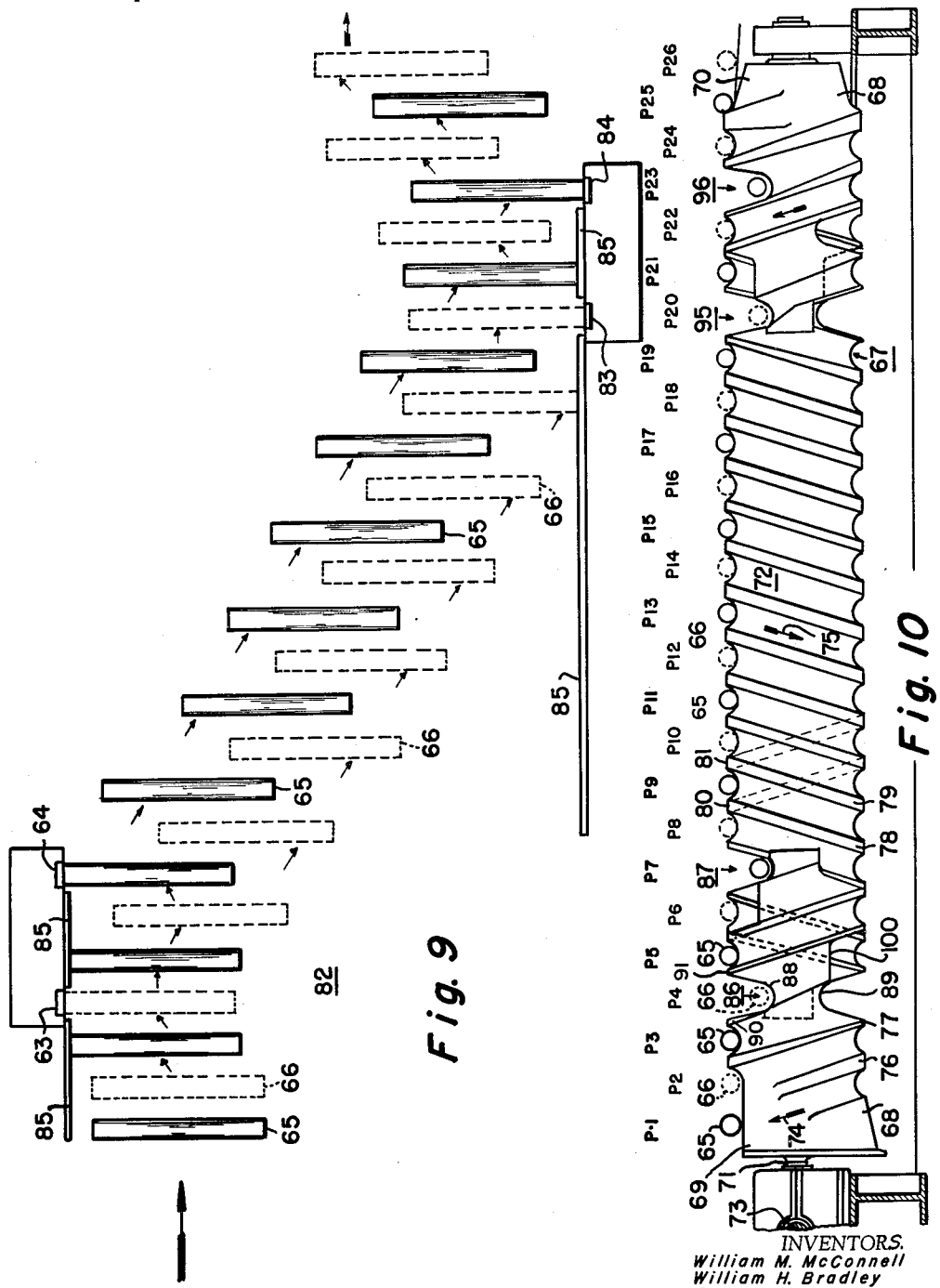

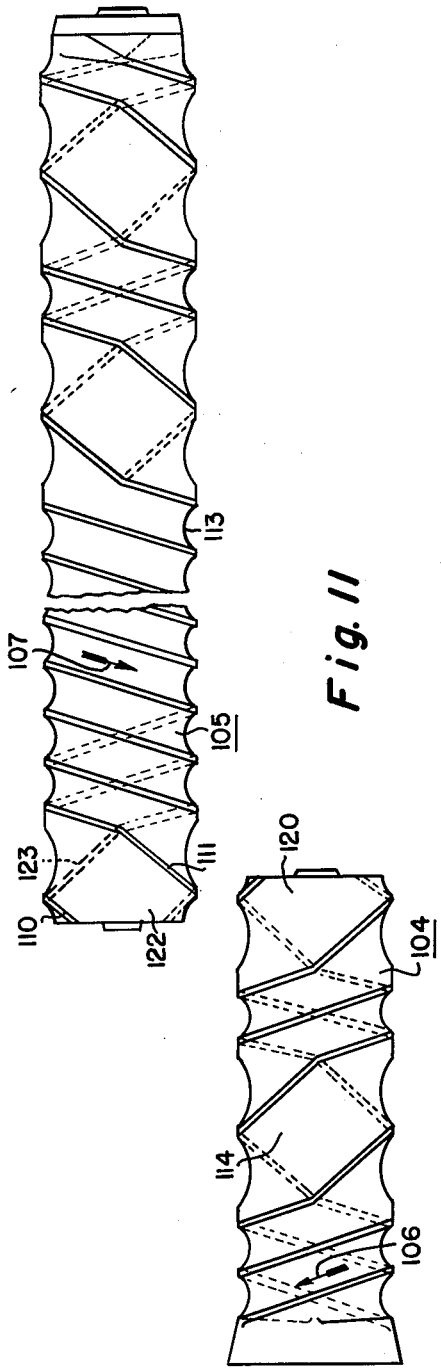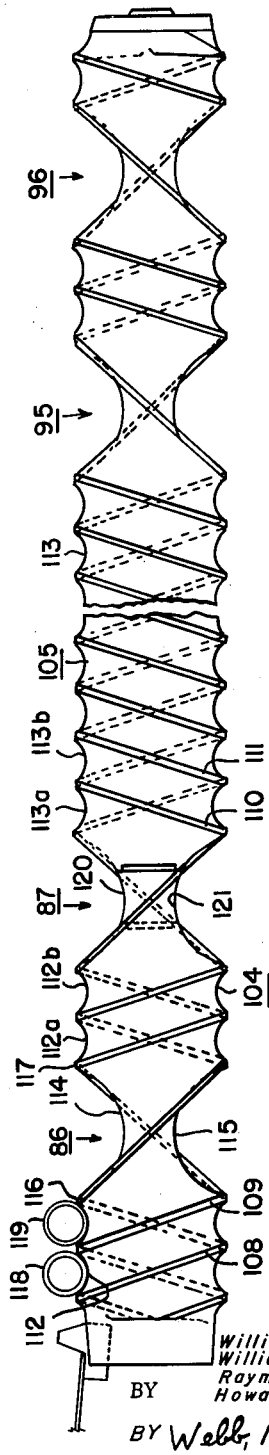

June 19, 1962   W. M. McCONNELL ETAL   3,039,584
ELONGATED ARTICLE HANDLING APPARATUS
Filed Sept. 7, 1961                       7 Sheets-Sheet 7

INVENTORS.
William M. McConnell
William H. Bradley
Raymond L. Carey
Howard E. Chappell
BY Webb, Mackey & Burden
THEIR ATTORNEYS United States Patent Office 3,039,584
Patented June 19, 1962

3,039,584
ELONGATED ARTICLE HANDLING APPARATUS
William M. McConnell, William H. Bradley, and Raymond L. Carey, Pittsburgh, and Howard E. Chappell, Butler, Pa., assignors to Taylor-Wilson Manufacturing Co., Pittsburgh, Pa., a corporation of Pennsylvania
Filed Sept. 7, 1961, Ser. No. 136,604
46 Claims. (Cl. 198—19)

This invention relates to handling apparatus for elongated articles such as pipes, tubes, bars, rods, rails, beams, etc. and more particularly to apparatus which picks off lengths of elongated articles, conveys them to and from a work station or stations, and aligns them prior to delivery to the stations. The apparatus has special utility for a pipe processing line in which hydraulic testing, facing, cutting off, threading, chamfering, reaming, drifting, coupling screw-on, and tightening operations are performed.

In pipe manufacture, lengths thereof are subjected to a number of different operations such as those mentioned above at various spaced apart stations. For high production and good efficiency, the work stations should be close together and conveyance of pipe to and from the stations should be fast and through short distances. In addition, alignment of a length of pipe prior to or simultaneously with its delivery into a work station expedites processing as does ability to simultaneously perform one or more of the operations upon two or more lengths.

One widely used type of pipe handling apparatus has been the walking beam mechanism which comprises a combination of raising and lowering levers, shafts and beams together with connections and accessories for transferring pipe from one station to another. Walking beam mechanisms are not only cumbersome, slow, complex and expensive, but have high maintenance costs and are subject to frequent mechanical breakdown.

Our invention in elongated article handling apparatus provides quick, efficient conveying of articles into and out of a plurality of work stations located on both sides of the apparatus together with alignment of the articles prior to their delivery to a station. Specifically, the handling apparatus comprises at least two pairs of rotatable rolls which extend and are arranged substantially transversely of the articles and of a work station and are disposed in tandem. The rolls are drivingly connected to a source of power for rotating them about their longitudinal axes with the rolls of each pair connected for rotation in opposite directions to one another.

Each roll has an entry end and an exit end and a substantially continuous helical rib extending along at least a part of its length in a direction towards the exit end. The rolls are disposed to receive thereon and convey therealong the article with the ribs positioned to engage and advance the article upon rotation of the rolls. The helical rib on one roll of a pair is right-handed and the helical rib on the other roll of a pair is left-handed so that the rolls consist of two groups with all rolls having the right-handed rib being rotatable in one direction and forming the first group and with all the rolls having the left-handed rib being rotatable in the opposite direction and forming the second group. In each of the two groups, all of the rolls rotate substantially in unison.

The helical rib on each roll of one of the first and second groups extends from a position in advance of the station to at least a location substantially in alignment with but laterally of the station so that upon rotation of the rolls of one of the first and second groups, the ribs thereon move the article to the location and simultaneously laterally towards the station. The helical rib on each roll of the other of the first and second groups extends at least from the location in a direction on past the station so that upon rotation of the rolls of the other of the first and second groups, the ribs thereon move the article away from the location and simultaneously laterally away from the station.

At the location, each roll of the one of the first and second groups has a first portion such as an eccentric with a high part and a low part for bringing the article into a given position at the station upon rotation to a first predetermined position. Each roll of the other of the first and second groups also has at the location a second portion such as an eccentric with a high part and a low part for removing the article from the given position upon rotation thereof from the second predetermined position.

The first and second predetermined positions are common to the rolls of the first and second groups. Also, the rolls of the two groups are positioned relative to each other so that at the first and second predetermined positions at one time there is a high part of one of the first and second eccentrics and a low part of the other of the first and second eccentrics, and at another time a low part of one of the first and second eccentrics and a high part of the other of the first and second eccentrics.

A modification of the handling apparatus simultaneously conveys at least two articles to and from a plurality of stations comprising at least a first and a second station located laterally of the apparatus and in tandem with one another with the first station in advance of the second. This modified apparatus comprises at least two pairs of rotatable rolls extending and arranged similarly to the first mentioned apparatus herein with one or both rolls of a pair having at least two coaxial substantially continuous helical ribs. Each of the two ribs on each roll has substantially the same pitch and is arranged so that turns of one rib are disposed intermediately of the turns of the other rib. Hereinafter, we shall describe more in detail this modification.

In the accompanying drawings, we have shown and described preferred embodiments of our invention in which:

FIGURE 2 is a plan view of a pair of rolls of the apparatus of FIGURE 1 but with the long roll on one shaft and the two short rolls or segments of a roll on a second shaft in reverse position relative to FIGURE 1;

FIGURE 3 is a side elevation view of the rolls of FIGURE 2;

Figure 1:
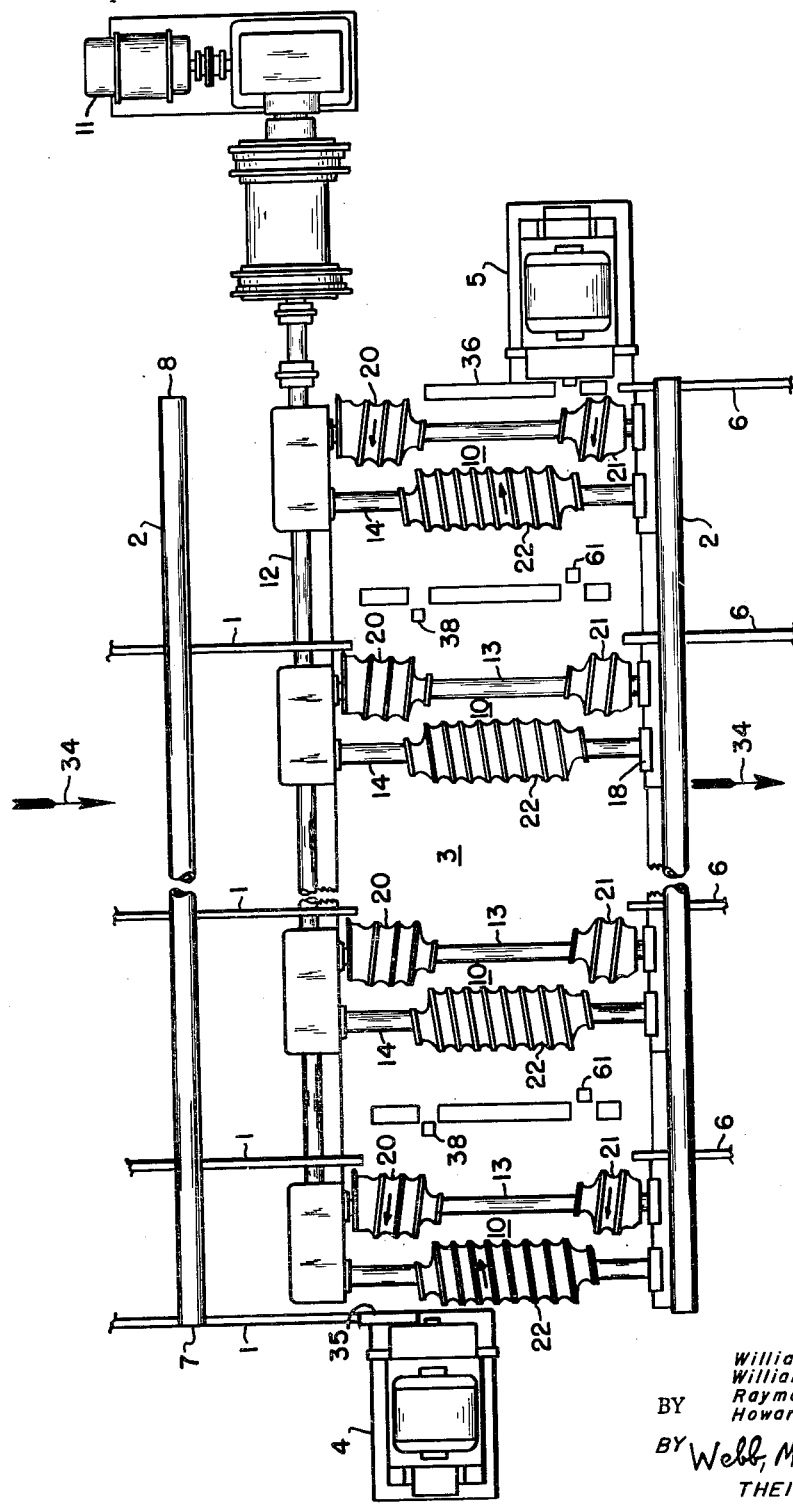
FIGURE 1 is a plan view of one embodiment of our invention.
Figure 6:
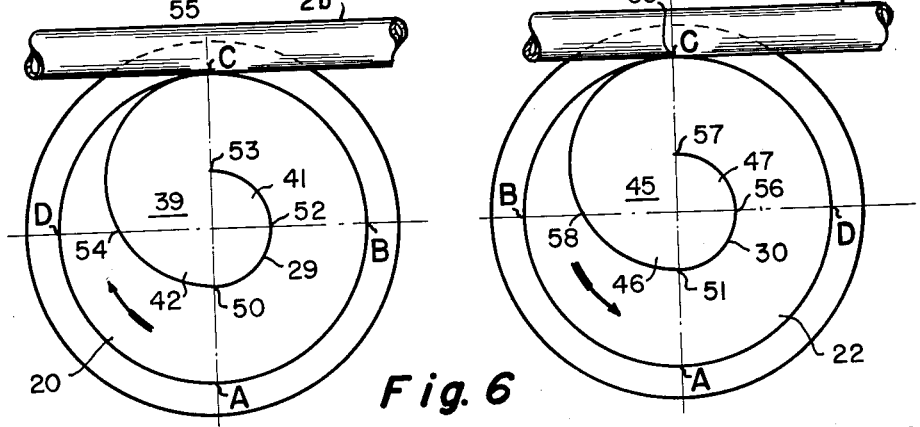
Figure 7:
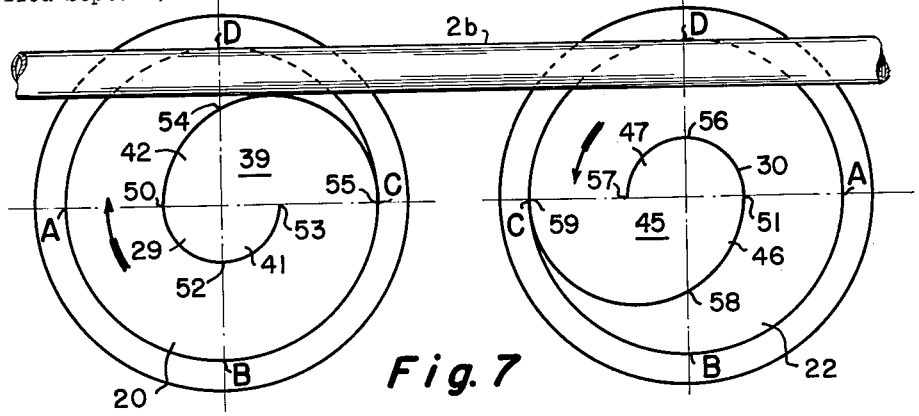
Figure 8:
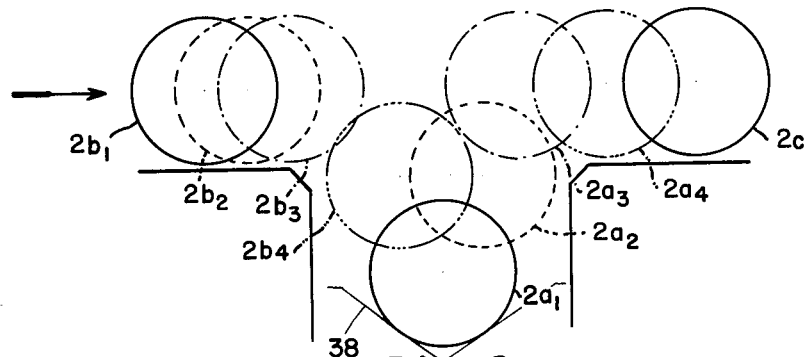
Figure 10A:
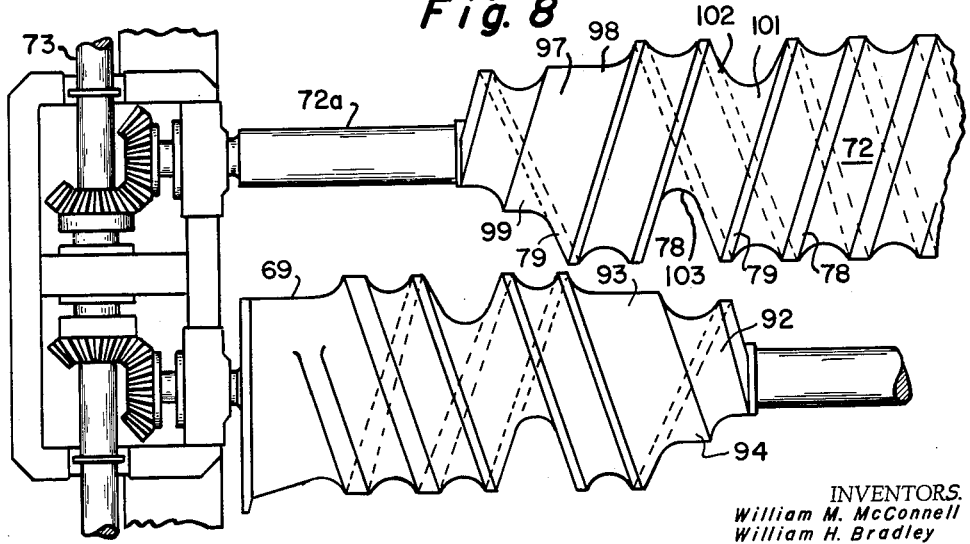
Figure 13:
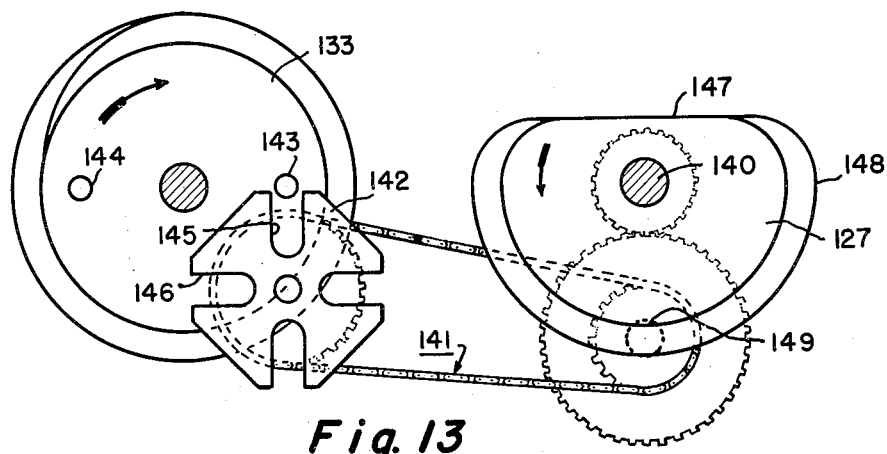
Figure 14:
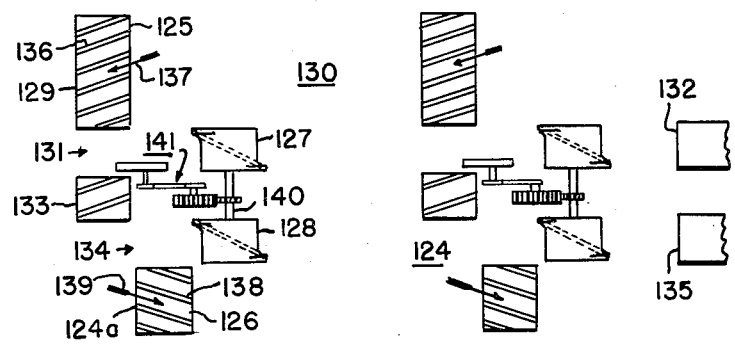
Figure 15:
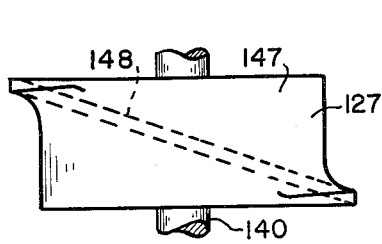
Figures 16, 17:
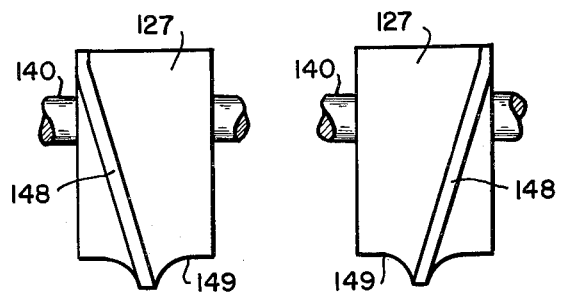

FIGURES 4–7 inclusive are schematic end elevation views showing positions of each roll of a pair for each quarter of a revolution at a location which is in alignment with but laterally of a pipe facing machine shown in FIGURE 1;

FIGURE 8 is a schematic view showing different positions of a pipe for each position of the rolls of FIGURES 4–7 inclusive;

FIGURE 9 is a schematic diagram showing a sequence of operation of a second embodiment of our invention wherein two elongated articles are simultaneously aligned for a first pair of facing machines, moved into the first pair of machines, conveyed therefrom, aligned for a second pair of machines, moved into the second pair of machines and then conveyed therefrom;

FIGURE 10 is a side elevation view of a pair of rolls for simultaneously handling two elongated articles as shown in FIGURE 9 with some parts omitted;

FIGURE 10a is a fragmentary plan view of the rolls of FIGURE 10;

FIGURE 11 is a plan view of a pair of rolls which comprises a third embodiment of our invention;

FIGURE 12 is a side elevation view of the rolls of FIGURE 11;

FIGURE 13 is an end elevation view of a fourth embodiment of our apparatus;

FIGURE 14 is a plan view of the embodiment of FIGURE 13;

FIGURE 15 is a plan view of an eccentric roll of the apparatus of FIGURE 13; and FIGURES 16 and 17 are end views of the eccentric roll of FIGURE 15.

Referring to the drawings, FIGURES 1, 2 and 3 show a plurality of entry skids 1 positioned to support and to deliver elongated articles such as pipe 2 to the front end of my handling apparatus 3 which conveys the pipe to a first end facing machine 4, then to a second end facing machine 5, and finally to exit skids 6. The first facing machine is at one side of the apparatus and the other facing machine at the opposite side but closer to the rear end of the apparatus than the first machine. Accordingly, end 7 of the pipe is faced in machine 4 and then the other end 8 is faced in the second machine 5 on the other side of the apparatus.

A stop arm 9 (FIGURE 3) holds the pipe 2 upon the entry skids 1 until picked off by an eccentric portion of a segment of a roll to be described hereinafter.

As shown, the apparatus comprises pairs 10 of rotatably driven rolls extending and positioned transversely of the pipe and disposed in tandem. A motor 11 drives a line shaft 12 which, in turn, rotates roll shafts 13 and 14 for each pair of rolls. The roll shafts 13 and 14 are connected to the line shaft 12 through beveled gears 15 and 16 respectively and supported by bearings 17 and 18 at their ends. On the roll shafts are the rolls of each pair with the shafts extending from the entry skids 1 to the exit skids 6.

Since each pair of rolls is substantially the same as the other pairs, a description of one pair is applicable to the others.

Referring to FIGURES 2 and 3, a pair 10 of rolls comprises a first roll 19 having two spaced apart segments 20 and 21 keyed to the shaft 13 and a second roll 22 keyed to the other shaft 14. The first roll 19 is connected through its bevel gear 15 to a first driving bevel gear 23 on the line shaft 12 whereby its direction of rotation is opposite to that of the second roll 22 connected through its bevel gear 16 to a second driving bevel gear 24 also on the line shaft 12. Arrows 25 and 26 indicate direction of rotation of rolls 19 and 22, respectively. Each of the segments 20 and 21 and the second roll 22 have symmetrical bodies except for the entry and exit ends which are eccentrics as will be described more in detail hereinafter.

Each segment and the second roll have an entry end 27 and an exit end 28 and on their periphery a continuous helical rib extending around the body and running from the entry end to the exit end. As shown, the helical rib 29 on the two segments 20 and 21 is left-handed and the helical rib 30 on the second roll 22 is right-handed with the pitch of the ribs on both the segments and the second roll being the same. Thus, all first rolls of a pair rotate in the same direction and have left-handed ribs and all second rolls of a pair rotate in the opposite direction and have right-handed ribs. Since all the rolls are driven from the line shaft 12, they rotate in unison.

Successive turns of the ribs 29 and 30, such as turns 31 and 32 respectively, form helical grooves 33 wherein the pipe lies while being conveyed from the entry skids to the exit skids.

As shown in FIGURE 1, all first rolls are in alignment transversely of pipe travel shown by arrows 34 and all second rolls also in alignment, thus providing alignment of a groove of each of the first and second rolls of a pair with corresponding grooves of the rolls of the other pairs.

The entry end 27 of segment 20 is an eccentric with a low part 27a and a high part 27b. At the entry end 27 and integral with the high part 27b of the eccentric is a knife ridge 27c which assists in picking off the pipe one at a time from the skid. As shown in FIGURE 3, the low part 27a is directly beneath pipe 2 on the entry skid 1. Upon rotation of segment 20, high part 27b and ridge 27c travel into engagement with pipe 2, pick it off skid 1, and convey it into engagement with rib 29, whereupon the pipe 2 advances both laterally and longitudinally towards the first facing machine 4 upon rotation of the segment. Lateral advancement results from the direction of rotation of the segment and longitudinal advancement from engagement by and rotation of the rib 29.

Extending from the facing machines 4 and 5 towards the entry skids are stop plates 35 and 36 against which the segments 20 move the ends 7 and 8 of the pipe 2 prior to its delivery to the machines. Rotation of the segments 20 conveys the pipe so that its end 7 engages the stop plate 35, thereby prealigning it before its delivery into the first machine 4.

Segment 20 extends from the entry skids to a first location 37 which is in alignment with but laterally of the first machine 4 and where there is a first saddle 38 for receiving and supporting the pipe from the exit end 28 of the segment 20. The saddle is in alignment with an extension of the center line of the first machine so that a pipe thereon is in position for an end facing operation.

Figure 4:
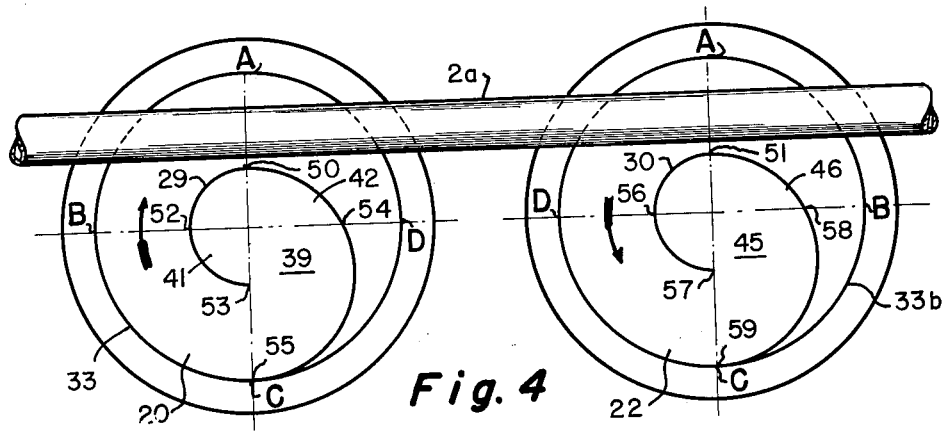

At the first location 37, the segment 20 has an eccentric 39 whose diameter is less than that of the segment body 40 so that both its low part 41 and high part 42 are below the periphery of the segment body 40. The low part 41 of the eccentric extends 180° around the body thereof and then graduates to the high part 42 for the next 180° of the body, whereby the high part terminates at the periphery thereof (FIGURE 4). The helical rib 29 extends through the high part 42 and through the low part 41 and terminates at the first location 37, thereby forming an advancing helical groove 43 which is an extension of the grooves 33 formed by the ribs on the body portions of the segment to advance the pipe to the eccentric and onto the saddle 38.

When the segment 20 is rotated to the position shown in FIGURES 2 and 3, the low part 41 is below the saddle 38, thus depositing the pipe onto the saddle and assuring that no part of the segment is in engagement with the pipe on the saddle during the end facing operation.

The second roll 22 extends from the first location 37 to a second location 44 which is in alignment with but laterally of the second machine 5. At the first location, the second roll has an entry eccentric 45 with a high part 46 and a low part 47 similar to the eccentric 39 of the first segment 20. The entry end 27 extends from the low part 47 of the entry eccentric to the high part 46 and then to the body portion 48 of the second roll and the rib thereof begins at the low part 47 of the eccentric, extends through the high part and onto the body portion 48, thereby forming a helically advancing groove 49 connecting with helical groove 33.

To pick off a pipe from the first saddle 38 and convey it laterally and longitudinally to the second machine 5, the second roll is rotated from the position of FIGURES 2, 3 and 4 so that the high part 46 of the entry eccentric 45 moves into engagement with and lifts the pipe off the saddle. Simultaneously, the low part 41 of the eccentric 39 of the first segment 20 is opposite the underside of the pipe on the saddle, thereby avoiding interference with the pick-off operation.

To better show different positions of each roll of a pair relative to the other at the first location during one complete revolution of each, reference points have been placed on rolls 20 and 22 (FIGURES 4–7 inclusive) so that reference point A is the starting point for each roll in its direction of rotation. From point A, each roll advances to point B, then point C, then point D, and finally back to point A with each of the reference points A, B, C and D spaced 90° apart around each roll. Also, FIGURES 4–7 inclusive show that the ribs 29 and 30 of the eccentrics follow or trace a path which is similar to the spiral of Archimedes and produce the advancing helical grooves 43 and 49 thereon which also follow a path similar to the spiral of Archimedes.

FIGURE 8 shows each position of a pipe as it moves from groove 33a on the first segment 20 onto the saddle 38 in one complete revolution of the segment 20 and then is picked off the saddle by the entry eccentric 45 and transferred onto the second roll in one complete revolution of the second roll.

In FIGURE 4, the first segment, the second roll and the pipe 2 are in the position illustrated in FIGURES 2 and 3 with low parts 41 and 47 of the two eccentrics below and the two eccentrics themselves out of engagement with the pipe. In making a complete revolution, successive portions of the periphery of each of the two eccentrics advance to a pipe support position; i.e., the position occupied by portions 50 and 51 of the two eccentrics 39 and 45 respectively as shown in FIGURES 2, 3 and 4 and represented as on the ribs 29 and 30. In pipe support position successive portions of the periphery of the eccentrics are either in engagement with or opposite and directly beneath a pipe at the first location. As shown in FIGURES 4–7 inclusive, portions 50, 52 and 53 define the low part 41 and portions 50, 54 and 55 define the high part 42 of the eccentric 39. Regarding the second roll, portions 51, 56 and 57 define the low part 47 and portions 51, 58 and 59 the high part 46 of the entry eccentric 45.

Figure 5:
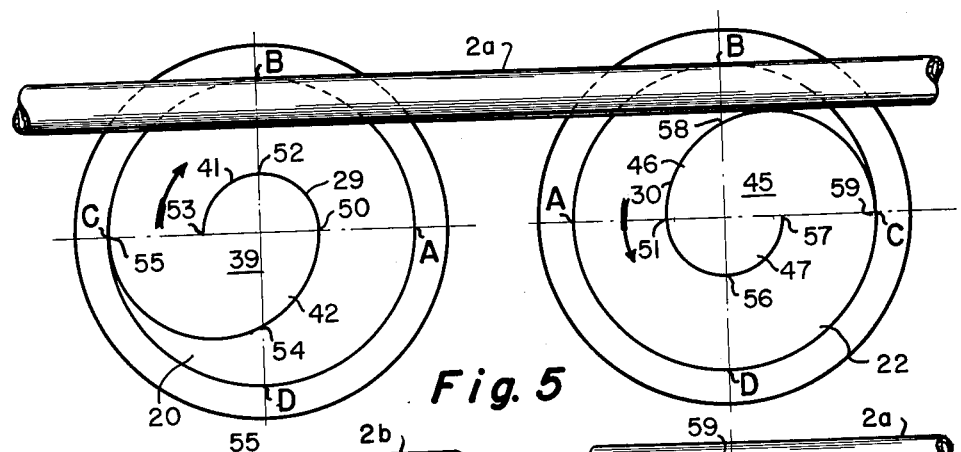

Referring to FIGURES 3, 4 and 8, pipe 2a is in position $2a_1$ on the saddle 38 and just above and out of engagement with eccentrics 39 and 45; pipe 2b is in position $2b_1$ for advancement from groove 33a onto the saddle; and pipe 2c has been picked off the saddle by the second roll and transferred to groove 33b thereof for conveyance to the second machine. From the position of FIGURE 4, rotation of eccentric 39 90° clockwise advances portion 52 of the low part 41 to pipe support position whereat it is beneath and does not engage the pipe (FIGURE 5). Simultaneously, rotation of the eccentric 45 90° in a counterclockwise direction from the position of FIGURE 4 to the position shown in FIGURE 5 moves portion 58 to pipe support position and causes high portion 46 to engage the pipe 2a, lift it off of the saddle and advance it to position $2a_2$ shown in FIGURE 8. Also, simultaneously, pipe 2b to be delivered onto the saddle has moved to position $2b_2$ (FIGURE 8).

As shown in FIGURE 6, the two eccentrics 39 and 45 have been rotated an additional 90° in their direction of rotation from the position of FIGURE 5 to the position of FIGURE 6 where they are again in the same position relative to one another. In the rotation, portions 53 and 55 of eccentric 39 have arrived at pipe support position, the low part 41 of the eccentric 39 has completed its travel past pipe support position and has brought the leading end of its high part 42 to pipe support position while moving pipe 2b to position $2b_3$ (FIGURE 8) where it is ready for lowering onto the saddle. Additionally, in the rotation portions 57 and 59 of eccentric 45 have arrived at pipe support position, high part 46 has completed its travel past pipe support position, and has raised pipe 2a to position $2a_3$ (FIGURE 8) where it is level with the periphery of the body 48 of the second roll.

An additional 90° rotation of the eccentrics 39 and 45 from the position of FIGURE 6 to the position of FIGURE 7 starts lowering of pipe 2b onto the saddle by arrival of portion 54 of high part 42 of eccentric 39 at pipe support position as illustrated by position $2b_4$ (FIGURE 8). Simultaneously, portion 56 of low part 47 of eccentric 45 has traveled to support position, thereby assuring no interference with lowering of the pipe 2b onto the saddle.

Rotation of the eccentric 45 90° from the position of FIGURE 7 back to its starting position of FIGURE 4 causes low part 47 to complete its travel past the pipe support position, thereby remaining out of engagement with pipe 2b being lowered onto the saddle to position $2a_1$ (FIGURE 8). Simultaneously, the leading portion 51 of its high part 46 advances to pipe support position for picking off the pipe from the saddle after the end facing operation.

A 90° rotation of eccentric 39 from the position of FIGURE 7 back to its starting position completes lowering of the pipe 2b on to the saddle and brings the leading end 50 of its low part 41 to pipe support position. Thus, the eccentric 39 of segment 20 and the eccentric 45 of the second roll 22 are keyed to their respective shafts so that low part 47 of eccentric 45 is in pipe support position while pipe on segment 20 is lowered onto the saddle. Correspondingly, the low part 41 of segment 20 is in pipe support position while the high part 46 picks off the pipe from the saddle. In this way, there is no interference with either delivery of a pipe onto the saddle or its removal therefrom.

The exit end of the second roll has an exit eccentric 60 identical to the eccentric 39 of the first segment 20 for delivery of the pipe onto a second saddle 61 at the second location 44. Correspondingly, the entry end 27 of the second segment 21 has an entry eccentric 62 which is the same as the entry eccentric 45 of the second roll for removal of the pipe from the second saddle and its advancement to the exit skids.

FIGURES 9, 10 and 10a show a second embodiment of our invention which prealigns, conveys into and out of two pipe end facing machines 63 and 64 disposed side by side (FIGURE 9) two lengths of pipe 65 and 66 with each machine end facing every other pipe. This second embodiment also can prealign and convey into and out of the first machine 63 every pipe. While FIGURE 10 shows a single pair 67 of rolls, it is understood that a plurality of pairs would be arranged in the same manner as the pairs of rolls of FIGURE 1.

Like the pairs of rolls of FIGURES 2 and 3, the pair of FIGURE 10 comprises a first roll 68 having two spaced apart segments 69 and 70 mounted upon a first driven shaft 71 (partially shown) and a second roll 72 mounted upon a second driven shaft 72a. Both shafts and rolls are driven off a line shaft 73 and roll 68 is rotated in a direction opposite to that of roll 72 with roll 68 revolving in the direction of arrow 74 and roll 72 in the direction of arrow 75. Each segment and the second roll have an exit end and an entry end and two coaxial continuous helical ribs 76 and 77 on the segments 69 and 70 and 78 and 79 on the second roll extending from the entry ends to the exit ends thereof. Each of the two ribs on the segments and the second roll has substantially the same pitch and is arranged on the periphery of its roll body with the turns of one rib disposed intermediate the turns of the other rib. Thus, the distance between successive turns such as turn 80 of rib 78 and turn 81 of rib 79 is a half pitch. Each of the segments has left-handed running ribs and the second roll has right-handed running ribs, all of which extend from the entry end to the exit end. Accordingly, rotation of the two segments in the opposite direction to that of the second roll advances pipe from the entry end to the exit end of the second embodiment.

As shown in FIGURE 9, pipe facing machines 63 and 64 are near the entry end and on one side of the apparatus which is indicated schematically by reference numeral 82. On the opposite side of the apparatus and near its exit end is a second pair of end facing machines 83 and 84 positioned side by side. Extending towards the entry end of the apparatus from each of the facing machines is a prealignment stop plate 85 against which an end of a pipe is conveyed just before it is delivered to an end facing machine.

Instead of two machines side by side such as machines 63 and 64, a single machine with provision for accommodating two pipe can be used.

Segment 69 extends from the entry end of the apparatus to a first location 86 in alignment with but laterally of the first machine 63 and onto a second location 87 in alignment with but laterally of the second machine 64. On the segment 69 at the first location are two portions such as two transverse cavities 88 and 89 located on opposite sides of the segment body, 180° apart and between turn 90 of rib 76 and turn 91 of rib 77. These cavities are formed by sloping surfaces of the segment body extending from its periphery in towards the longitudinal axis of the segment to a bottom and then from the bottom back to the periphery thereof.

The exit end of segment 69 terminates at the second location 87 in an elongated eccentric 92 which has a high part 93 and a low part 94 (FIGURE 10a) similar to the eccentric 39 of segment 20 of FIGURES 2 and 3 and which extends a greater distance along the axis of rotation of the segment than eccentric 39. To provide easy movement of the pipe into and out of the two cavities at the first location and to the eccentric at the second location, the pitch of the ribs is increased over that used for the balance of the segment.

For FIGURES 9 and 10, different positions occupied by the two pipe 65 and 66 in their travel into and away from the facing machines are shown as P1–P26 inclusive.

Rib 77 leads to cavity 88 so that one full revolution of segment 69 advances pipe 66 from position P2 to position P4 and into cavity 88. Rib 76 leads to cavity 89 so that a half revolution of the segment 69 advances pipe 65 from position P3 to position P4 and into the cavity 89. Thus, every pipe can be faced by machine 63 upon a half revolution of the segment and every other pipe faced by the machine 63 upon a full revolution thereof.

One complete revolution of segment 69 advances pipe 65 from position P3 to position P5 which is past the first location 86 and a second complete revolution thereof advances pipe 65 from position P5 to position P7 which is at the second location 87. As shown, rib 76 extends to the exit end of segment 69, thereby moving the pipe 65 to the second location 87 while rib 77 terminates short of the exit end. Accordingly, apparatus 82 handles two pipe simultaneously regarding delivery to and removal from two machines such as machines 63 and 64 and machines 83 and 84.

The second roll 72 extends from the first location 86 past the second location 87 to a third location 95 which is in alignment with but laterally of machine 83 and then onto a fourth location 96 which is in alignment with but laterally of the machine 84. The entry end of the second roll 72 is an eccentric 97 with a high part 98 and a low part 99 similar to eccentric 92 of the first segment 69. Thus, the eccentric 97 effects a transfer of pipe 66 at position P4 and the first location 86 from segment 69 onto second roll 72 in substantially the same manner as pipe is transferred by the apparatus of FIGURES 1–7 inclusive. This transfer comprises a pick-off by the eccentric 97 and an advancement of pipe 66 from position P4 to position P6 in one full revolution of the second roll 72. Rib 79 runs from the entry end of the roll 72 to position P6 and then onto position P8 so that a second full revolution moves the pipe 66 on past the second location 87 to position P8 and by-passes machine 64. To avoid interference with the transfer, segment 69 has a reduced diameter part 100 adjacent to cavity 89 and on the exit end thereof.

On the second roll 72 at the second location 87 is another eccentric 101 with high part 102 and low part 103 and with rib 78 extending from the entry end of location 87 to the exit end of the roll. Accordingly, eccentric 101 and rib 78 pick off pipe 65 at the second location 87 and position P8 from eccentric 92 of the first segment 69 and transfer it onto roll 72 together with movement to position P10 in one full revolution of roll 72. This pick-off and transfer of pipe 65 is similar to that previously described in regard to the apparatus of FIGURES 1–7 inclusive.

At the third and fourth locations 95 and 96 the second roll 72 has structure identical to that of the first segment 69 for the first and second locations 86 and 87. Likewise, the structure of the second segment 70 at the third and fourth locations is identical to that of the second roll at the first and second locations. Accordingly, handling of pipe at machines 83 and 84 is identical to that at machines 63 and 64 regarding delivery of every pipe to machine 83 and every other pipe to machines 83 and 84 and regarding pick-off and transfer of pipe from the second roll 72 onto the second segment 70.

As shown in FIGURE 9, pipe 65 and 66 are moved laterally across the apparatus 82 towards machines 63 and 64 by the first segment 69 so that one end engages face stop plates 85 just prior to delivery into their respective facing machine. Additionally, the second roll moves the pipe laterally across the apparatus in the opposite direction towards machines 83 and 84, whereby the other end thereof engages the stop plates 85 prior to their delivery to the facing machines 83 and 84.

A third embodiment of our invention shown in FIGURES 11 and 12 can handle two pipes simultaneously and deliver to and remove from each machine of a pair of machines, such as machines 63 and 64 of FIGURE 9, every pipe. Thus, if this third embodiment were servicing machines 63 and 64, each of pipe 65 and 66 can be delivered to and removed from each machine. Also, this third embodiment can present every pipe to machine 63 and every other pipe to machine 64 and additionally alternate pipe to each machine.

The embodiment of FIGURES 11 and 12, which will be described in relation to FIGURE 9 and machines 63 and 64, comprises a first roll 104 and a second roll 105 mounted and driven similarly to first roll 68 and second roll 72 respectively with the first roll rotating in the direction of arrow 106 and the second roll in the direction of arrow 107. The first roll 104 has two coaxial continuous helical ribs 108 and 109 of the same pitch and extending from its entry end to its exit end to form a plurality of helical grooves 112 in which pipe lies. Likewise, the second roll 105 has two coaxial continuous helical ribs 110 and 111 of the same pitch and extending from its entry end to its exit end to form a plurality of helical grooves 113 like grooves 112. On each of the two rolls the turns of one rib are intermediate the turns of the other rib. Roll 104 has left-handed running ribs and roll 105 right-handed running ribs.

As shown, the first roll extends from the entry end of the apparatus 82 to the first location 86 and onto the second location 87. At the first location 86, the first roll has two portions such as transverse cavities 114 and 115 located on opposite sides of the roll 180° apart and between turn 116 of rib 108 and turn 117 of rib 109. Rib 108 runs to cavity 114 so that one complete revolution of roll 104 advances pipe 118 thereto and rib 109 runs to cavity 115 and onto groove 112a whereby a half revolution of the roll moves pipe 119 to cavity 115 and a full revolution to groove 112a which is on the exit side of cavity 114.

At the second location 87, the roll 104 terminates and there has two portions such as cavity-like seats 120 and 121 located on opposite sides of the roll and 180° apart. Rib 109 leads to seat 120 whereby one full revolution of roll 104 brings a pipe in groove 112a onto the seat 120. Since rib 108 runs to seat 121, a half revolution of the roll delivers a pipe in groove 112b onto the seat 121.

The second roll 105 extends from the second location 87 onto the third and fourth locations 95 and 96. At the second location, the entry end of the second roll 105 has two cavity-like seats 122 and 123 on opposite sides of the roll and 180° apart. Rib 110 runs from seat 122 to the exit end of the roll whereby a full revolution thereof from the position of FIGURES 11 and 12 picks off a pipe from seat 120 on roll 104 and advances it to groove 113b of roll 105. Similarly, rib 111 extends from seat 123 to the exit end of roll 105 so that a half revolution thereof picks off a pipe from seat 121 of roll 104 and delivers it to groove 113a of roll 105.

One full revolution of rolls 104 and 105 advances a pipe in groove 112b of roll 104 to location 87 where it is picked off from seat 121 by roll 105 and delivered to groove 113a of roll 105.

A fourth embodiment of our invention shown in FIGURES 13-17 comprises a plurality of combinations 124 of pairs of rolls and of one or more eccentric rolls for each pair driven by one of the rolls of a pair. The pairs of rolls are driven in the same manner as the previously described rolls herein with one roll of a pair driven in an opposite direction to the other roll of the pair. Since each combination is the same, a description of one is applicable to the others. Referring to combination 124a, it comprises a pair of rolls 125 and 126 and a pair of substantially identical eccentric rolls 127 and 128. Roll 125 comprises a first segment 129 which extends from the entry end of the apparatus 130 to a first location 131 in alignment with but laterally of a first facing machine 132 and a second segment 133. From the first location, the second segment extends to a second location 134 which is in alignment with but laterally of a second facing machine 135.

The second roll 126 extends from the second location 134 towards the exit end of the apparatus.

Each segment of roll 125 has right-handed running continuous helical ribs 136 and rotates in the direction of arrow 137. Correspondingly, roll 126 has a left-handed running continuous helical rib 138 and it rotates in the direction of arrow 139 which direction is opposite to that of roll 125. As shown, the ribs 136 and 138 are the same as those of the embodiment of FIGURES 9 and 10.

At the first and second locations are the eccentric rolls 127 and 128 respectively, each identical to the other. A horizontal shaft 140 mounts the two eccentric rolls and a chain and gear drive 141 rotates the shaft and the eccentrics when actuated by a slotted disk 142 through pins 143 and 144 mounted upon driven segment 133. The pins, disk and chain and gear drive rotate the eccentric rolls one complete revolution from the position of FIGURE 13 for a quarter revolution of the segment 133. Since there are only two pins spaced 180° apart, the eccentric rolls revolve only 50% of the time that the segment 133 revolves. Accordingly, a time interval results in which the eccentric is stationary to permit completion of the facing operation.

Rotation of the disk 142 results from entry of pin 143 into slot 145 during turning of segment 133 whereupon the disk revolves 90° with the segment until the pin exits from the slot 145 which then has reached the position of slot 146. This 90° rotation of the disk effects one full revolution of the eccentric rolls.

As shown in FIGURES 13 and 15-17, the eccentric roll 127 has a low part 147 which is below the top of segments 129 and 133 and of roll 126 and onto which segment 125 delivers pipe for a facing operation. On the opposite side of the eccentric is a high part 149 for lifting and transferring a pipe on the eccentric onto segment 133 after the facing operation. Extending helically around the eccentric roll 127 except for low part 147 is a rib 148, shown as right-handed, which in combination with the high part 149 lifts, advances, and transfers pipe onto segment 133 in one revolution of the eccentric. Thus, the eccentric roll 127 transfers a pipe onto segment 133 in a quarter revolution of the segment and thereby materially speeds up operation of the fourth embodiment.

Since eccentric roll 128 functions similarly to eccentric roll 127 but in regard to segment 133 and roll 126, it need not be further described.

The fourth embodiment is less expensive to manufacture than the other three embodiments because the ribs of its rolls can be machined, whereas the rolls of the three other embodiments must be produced from castings due to expense and difficulty in machining the eccentrics.

While our invention has been shown by the embodiments of FIGURES 9 and 10 and of FIGURES 11 and 12 for simultaneously handling two pipe, it may be easily modified to simultaneously accommodate three, four or more pipe. This increased capacity requires addition of more ribs to the rolls of each pair. For example, to handle three pipe simultaneously, each roll of a pair has three coaxial ribs instead of the two ribs of the second and third embodiments. Four pipe then call for four ribs per roll, etc.

Our handling apparatus has important advantages which render it valuable for fast, efficient conveyance of elongated articles to and from work stations. In the first place, it has substantial versatility in that delivery of every pipe and/or every other pipe to and removal from selected work stations is achieved by a single apparatus.

In the second place, it enjoys a simple and rugged structure together with a rotary motion for moving the articles. Thus, it is materially superior to the walking beam mechanism which has a raising and lowering motion and a large number of parts and components. Accordingly, our invention achieves lower repair and maintenance costs than the walking beam mechanism.

In the third place, our invention effects compactness and space-saving in an installation which includes a plurality of work stations because the work stations can be placed on both sides of the apparatus instead of all being in tandem on one side. Thus, the length of the apparatus can be materially shortened and more efficient use of space realized.

In the fourth place, it is particularly suitable for elongated articles which require a fabrication operation on each end. The articles are simply moved from one side of the apparatus to the other instead of reversing them end for end.

While we have shown and described present preferred embodiments of our invention, it is to be understood that it may be otherwise embodied within the scope of the following claims.

We claim:

1. Elongated article handling apparatus for conveying at least one length of an elongated article to and from a station positioned laterally of said apparatus comprising, at least two pairs of rotatable rolls extending and arranged substantially transversely of said length of article and of said station and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, in each of said two groups all rolls being rotatable substantially in unison, said helical rib on each roll of one of said first and second groups extending from a position in advance of said station to at least a location substantially in alignment with but laterally of said station so that upon rotation of said rolls of said one of said first and second groups said ribs thereon move said article to said location and simultaneously laterally towards said station, said helical rib on each roll of said other of said first and second groups extending at least from said location in a direction on past said station so that upon rotation of said rolls of said other of said first and second groups, said ribs thereon move said article away from said location and simultaneously laterally away from said station.

2. The apparatus of claim 1 characterized by each roll of said one of said first and second groups having a portion therealong substantially at said location for delivering said article to a place below the top of said roll of said one of said first and second groups and substantially at said location upon rotation thereof to a first predetermined position, said portion extending from a part of the periphery of its roll inwardly towards the longitudinal axis thereof, towards said place and forming substantially a continuation of the peripheral surface of its roll, each roll of said other of said first and second groups having a portion adjacent said location for removing said article from said place upon rotation thereof from a second predetermined position, said portion extending from a part of the periphery of its roll inwardly towards the longitudinal axis thereof and toward said place and forming substantially a continuation of the peripheral surface of its roll to convey said article from said place.

3. The apparatus of claim 2 characterized by first and second predetermined positions being common to said rolls of said first and second groups.

4. The apparatus of claim 1 characterized by each roll of said one of said first and second groups having at said location a first eccentric with a high part and a low part for bringing said article into a given position at said location upon rotation thereof to a first predetermined position, each roll of said other of said first and second groups having at said location a second eccentric with a high part and a low part for removing said article from said given position upon rotation thereof from a second predetermined position.

5. The apparatus of claim 4 characterized by said first and second predetermined positions being common to said rolls of said first and second groups and by said rolls of said first and second groups being positioned relative to each other so that at said first and second predetermined positions at one time there is a high part of one of said first and second eccentrics and a low part of the other of said first and second eccentrics and at another time a low part of one of said first and second eccentrics and a high part of the other of said first and second eccentrics.

6. The apparatus of claim 4 characterized by each roll of said one of said first and second groups and its rib extending helically to said high part of said first eccentric and then extending helically to said low part thereof and by each roll of said other of said first and second groups and its rib extending helically from said low part of said second eccentric to said high part thereof and then to that portion of said roll extending beyond said station.

7. Elongated article handling apparatus for conveying at least one length of an elongated article to and from a station positioned laterally of said apparatus comprising, at least two pairs of rotatable rolls extending and arranged substantially transversely of said length of article and of said station and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, all rolls in each of said two groups being rotatable substantially in unison, each roll of one of said first and second groups and its helical rib extending from a position in advance of said station to a location substantially in alignment with but laterally of said station, each roll of said other of said first and second groups and its helical rib extending from said location on past said station, at said location at least two eccentric disks mounted upon rotatable shafts for rotation therewith, each of said disks being arranged substantially transversely of said article, being disposed in tandem and laterally of a pair of said rolls, having a low part below the tops of said rolls when in a first given position, said low part being adapted for receiving said article from said one of said first and second groups, each disk also having a high part extending at least to the tops of said rolls when in a second given position, said high part being adapted to transfer said article onto said other of said first and second groups, a driving connection between each of said shafts and one roll of a pair, said driving connection being such that said eccentric disks rotate substantially in unison and from said first given position to said second given position and then to said first given position upon a predetermined fraction of a revolution of said one roll of a pair.

8. Elongated article handling apparatus for conveying at least one length of an elongated article to and from a plurality of stations comprising at least first and second stations positioned laterally of said apparatus and in tandem with said first station in advance of said second station and substantially side by side, said apparatus comprising, at least two pairs of rotatable rolls extending and arranged substantially transversely of said length of article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, in each of said two groups all rolls being rotatable substantially in unison, said helical rib on each roll of one of said first and second groups extending from a position in advance of said first station to a first location substantially in alignment with but laterally of said first station and extending further to at least a second location substantially in alignment with but laterally of said second station so that upon rotation of said rolls of said one of said first and second groups, said ribs thereon move said article toward and to said first location and simultaneously laterally to said first station upon a given amount of rotation and upon a given further amount of rotation from said first station to said second location and said second station, said helical rib on each roll of said other of said first and second groups extending at least from said second location in a direction on past said second station so that upon rotation of said rolls of said other of said first and second groups, said ribs thereon move said article away from said second location and simultaneously laterally away from said second station.

9. The apparatus of claim 8 characterized by each roll of said one of said first and second groups having a first portion substantially at said first location for delivering said article to a first place below the top of said roll of said one of said first and second groups and substantially at said first location upon rotation thereof to a first predetermined position and having a second portion substantially at said second location for delivering said article to a second place below the top of said roll of said one of said first and second groups and substantially at said second location upon rotation thereof to a second predetermined position, said first portion extending from a part of the periphery of its roll inwardly towards the longitudinal axis thereof and then away from said longitudinal axis back to its periphery, extending towards and away from said first place and forming a continuation of the peripheral surface of its roll so that rotation of its roll conveys said article to said first place and so that further rotation thereof conveys said article from said first place and away from said first station, said second portion extending from a part of the periphery of its roll inwardly towards the longitudinal axis thereof, towards said second place and forming a continuation of the peripheral surface of its roll to convey said article to said second place, each roll of said other of said first and second groups having a portion adjacent said second location for removing said article from said second place upon rotation thereof from a predetermined position, said portion of said other rolls of said two groups extending from a part of the periphery of its roll inwardly towards the longitudinal axis thereof and towards said second place and forming substantially a continuation of the peripheral surface of its roll to convey said article from said second place upon rotation thereof.

10. The apparatus of claim 9 characterized by each of said first and second portions of said one of said two groups of rolls being disposed on substantially the same side of their rolls so that said first and second portions reach said first and second locations respectively substantially simultaneously upon rotation thereto.

11. The apparatus of claim 8 characterized by each roll of said one of said first and second groups having at said first location a first eccentric and at said second location a second eccentric, each of said first and second eccentrics having a high part and a low part for bringing said article into a given place at each of said locations upon rotation thereof to a first predetermined position, each roll of said other of said first and second groups having at said second location an eccentric with a high part and a low part for removing said article from said given place at said second location upon rotation thereof from a second predetermined position.

12. The apparatus of claim 11 characterized by said first and second predetermined positions being common to said rolls of said first and second groups and by said rolls of said first and second groups being positioned relative to each other so that at said first and second predetermined positions at one time there is a high part of said first and second eccentrics and a low part of the eccentric of the rolls of said other of said two groups of rolls and at another time a low part of said first and second eccentrics and a high part of the eccentric of the rolls of said other of said two groups of rolls.

13. The apparatus of claim 11 characterized by each roll of said one of said first and second groups and its rib extending helically to said high part of each of said first and second eccentrics and then extending helically to said low part thereof and by each roll of said other of said first and second groups and its rib extending helically from said low part of the eccentric thereof to said high part and then to that portion of said roll extending from said second station.

14. Elongated article handling apparatus for conveying at least one length of an elongated article to and from a plurality of stations comprising at least first and second stations positioned laterally of said apparatus and in tandem with said first station in advance of said second station and substantially side by side, said apparatus comprising, at least two pairs of rotatable rolls extending and arranged substantially transversely of said length of article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, in each of said two groups all rolls being rotatable substantially in unison, each roll of one of said first and second groups comprising first and second segments, each of said first segments and its helical rib extending from a position in advance of said two stations to a first location substantially in alignment with but laterally of said first station, each of said second segments and its helical rib extending from said first location to a second location substantially in alignment with but laterally of said second station, each roll of said other of said first and second groups and its helical rib extending from said second location on past said second station, at each of said first and second locations at least two eccentric disks mounted upon rotatable shafts for rotation therewith, each of said disks being arranged substantially transversely of said article, being disposed in tandem and laterally of a pair of said rolls, having a low part below the tops of said rolls when in a first given position, said low part being adapted for receiving said article from said first segments as to those disks at said first location and from said second segments as to those disks at said second location, each disk also having a high part extending at least to the tops of said rolls when in a second given position, said high part being adapted to transfer said article onto said second segment as to those disks at said first location and onto said rolls of said other of said first and second groups as to those disks at said second location, a driving connection between each of said shafts and one roll of a pair of rolls, said driving connection being such that said eccentric disks at each of said first and second locations rotate substantially in unison and rotate from said first given position to said second given position and then to said first given position upon a predetermined fraction of a revolution of said one roll of a pair of rolls.

15. Elongated article handling apparatus for conveying at least one length of an elongated article to and from a plurality of stations comprising at least first and second stations positioned laterally of said apparatus and in tandem with said first station in advance of said second station and substantially side by side, said apparatus comprising at least two pairs of rotatable rolls extending and arranged substantially transversely of said length of article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, in each of said two groups all rolls being rotatable substantially in unison, each roll of one of said first and second groups comprising first and second segments, each of said first segments and its helical rib extending from a position in advance of said two stations to a first location substantially in alignment with but laterally of said first station, each of said second segments and its helical rib extending from said first location to at least a second location substantially in alignment with but laterally of said second station, each roll of said other of said first and second groups and its helical rib extending from at least said second location on past said second station, at said first location at least two eccentric disks mounted upon rotatable shafts for rotation therewith, each of said disks being arranged substantially transversely of said article, being disposed in tandem and laterally of a pair of said rolls, having a low part below the tops of said rolls when in a given first position, said low part being adapted for receiving said article from said first segments, each disk also having a high part extending at least to the tops of said rolls when in a second given position, said high part being adapted to transfer said article onto said second segments, a driving connection between each of said shafts and one roll of a pair of rolls, said driving connection being such that said eccentric disks rotate substantially in unison and from said first given position to said second given position and then to said first given position upon a predetermined fraction of a revolution of said one roll of a pair.

16. The apparatus of claim 15 characterized by each second segment having a portion substantially at said second location for delivering said article to a place below the top of said segment and substantially at said second location upon rotation thereof to a predetermined position, said portion extending from a part of the periphery of its segment inwardly towards the longitudinal axis thereof and forming a continuation of the peripheral surface of its segment so that rotation thereof conveys said article to said place, each roll of said other of said first and second groups having a portion adjacent said second location for removing said article from said place upon rotation thereof from a predetermined position, said portion of said other rolls extending from a part of the periphery thereof inwardly towards the longitudinal axis thereof and towards said place and forming substantially a continuation of the peripheral surface thereof to convey said article from said place upon rotation thereof.

17. Elongated article handling apparatus for conveying at least one length of an elongated article to and from a plurality of stations comprising at least first and second stations positioned laterally of said apparatus and in tandem with said first station in advance of said second station and substantially side by side, said apparatus comprising, at least two pairs of rotatable rolls extending and arranged substantially transversely of said length of article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said helical rib on one roll of each pair being right-handed and said helical rib on the other roll of each pair being left-handed, said rolls consisting of two groups with all rolls having said right-handed helical rib being rotatable in one direction and forming a first group and with all rolls with said left-handed helical rib being rotatable in the opposite direction and forming a second group, in each of said two groups all rolls being rotatable substantially in unison, said helical rib on each roll of one of said first and second groups extending from a position in advance of said first station to a first location substantially in alignment with but laterally of said first station and extending further to at least a second location substantially in alignment with but laterally of said second station so that upon rotation of said rolls of said one of said first and second groups, said ribs thereon move said article toward and to said first location and simultaneously laterally to said first station upon a given amount of rotation and upon a given further amount of rotation from said first station to said second location and said second station, said helical rib on each roll of said other of said first and second groups extending at least from said second location in a direction on past said second station so that upon rotation of said rolls of said other of said first and second groups, said ribs thereon move said article away from said second location and simultaneously laterally away from said second station, at said second location at least two eccentric disks mounted upon rotatable shafts for rotation therewith, each of said disks being arranged substantially transversely of said article, being disposed in tandem and laterally of a pair of said rolls, having a low part below the tops of said rolls when in a first given position, said low part being adapted for receiving said article from said one of said first and second groups, each disk also having a high part extending at least to the tops of said rolls when in a second given position, said high part being adapted to transfer said article onto said rolls of said other of said first and second groups, a driving connection between each of said shafts and one roll of a pair of rolls, said driving connection being such that said eccentric disks rotate substantially in unison and from said first given position to said second given position and then to said given position upon a predetermined fraction of a revolution of said one roll of a pair.

18. Elongated article handling apparatus for conveying at least one length of an elongated article to and from a plurality of stations comprising, at least first and second stations positioned laterally of said apparatus and in tandem with said first station in advance of said second station and substantially side by side, said apparatus comprising at least two pairs of rotatable rolls extending and arranged substantially transversely of said article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said rib on one roll of each pair being right-handed and said rib on the other roll being left-handed, said rolls consisting of two groups with all rolls having said right-handed rib being rotatable in one direction and forming a first group and with all rolls with said left-handed rib being rotatable in the opposite direction and forming a second group, in each of said two groups all rolls being rotatable substantially in unison, said rib on each roll of one of said first and second groups comprising at least first and second coaxial ribs each having substantially the same pitch and being arranged on the periphery of their roll so that turns of one are disposed intermediately of turns of the other, each of said first ribs extending from a position in advance of said two stations to at least a first location substantially in alignment with but laterally of said first station, each of said second ribs extending from a position in advance of said two stations to at least a second location substantially in alignment with but laterally of said second station, said rib on each roll of said other of said first and second groups extending at least from said second location in a direction on past said second station so that upon rotation of said rolls of said other of said first and second groups, said ribs thereon move said article away from said second location and simultaneously laterally away from said second station.

19. The apparatus of claim 18 characterized by each roll of said one of said first and second groups having a first portion substantially at said first location for delivering said article to a first place below the top of said roll of said one of said first and second groups and substantially at said first location upon rotation thereof to a first predetermined position and having a second portion substantially at said second location for delivering said article to a second place below the top of said roll of said one of said first and second groups and substantially at said second location upon rotation thereof to a second predetermined position, said first portion extending from a part of the periphery of its roll inwardly towards the longitudinal axis thereof and then away from said longitudinal axis back to its periphery, extending towards and away from said first place and forming a continuation of the peripheral surface of its roll so that rotation of its roll conveys said article to said first place and so that further rotation of its roll conveys said article from said first place and away from said first station, said second portion extending from a part of the periphery of its roll inwardly towards the longitudinal axis thereof, towards said second place and forming a continuation of the peripheral surface of its roll to convey said article to said second place, each roll of said other of said first and second groups having a portion adjacent said second location for removing said article from said second place upon rotation thereof from a predetermined position, said portion of said other rolls of said two groups extending from a part of the periphery of its roll inwardly towards the longitudinal axis thereof and towards said second place and forming substantially a continuation of the peripheral surface of its roll to convey said article from said second place upon rotation thereof.

20. The apparatus of claim 19 characterized by each of said first and second portions of said one of said two groups of rolls being disposed on substantially the same side of their rolls so that said first and second portions reach said first and second locations respectively substantially simultaneously upon rotation thereof.

21. The apparatus of claim 19 characterized by each roll of said one of said first and second groups having a third portion substantially similar to said first portion, substantially at said first location and on that side of said roll opposite said first portion, having a fourth portion substantially similar to said second portion substantially at said second location and on that side of said roll opposite said second portion and by each roll of said other of said first and second groups having an additional portion substantially similar to said first mentioned portion thereof substantially at said second location and on that side of said roll opposite said first mentioned portion.

22. The apparatus of claim 21 characterized by each of said first and second portions of said one of said two groups of rolls being disposed on substantially the same side of their rolls so that said first and second portions reach said first and second locations respectively substantially simultaneously upon rotation thereof and by each of said third and fourth portions of said one of said two groups of rolls being disposed on substantially the same side of their rolls so that said third and fourth portions reach said first and second locations respectively substantially simultaneously upon rotation thereto.

23. The apparatus of claim 21 characterized by said second coaxial rib of each roll of said one of said first and second groups running to said third portion and by said first coaxial rib of each roll of said one group running to said fourth portion.

24. The apparatus of claim 19 characterized by each roll of said one of said first and second groups having a third portion substantially similar to said first roll, substantially at said first location and on that side of said roll opposite said first portion.

25. The apparatus of claim 24 characterized by each of said first and second portions of said one of said two groups of rolls being disposed on substantially the same side of their rolls so that said first and second portions reach said first and second locations respectively substantially simultaneously upon rotation thereto.

26. The apparatus of claim 24 characterized by said second coaxial rib of each roll of said one of said first and second groups running to said third portion.

27. The apparatus of claim 18 characterized by each roll of said one of said first and second groups having at said first location a first eccentric and at said second location a second eccentric, each of said first and second eccentrics having a high part and a low part for bringing said article into a first given place at said first location and into a second given place at said second location upon rotation thereof to a first predetermined position, each roll of the other of said first and second groups having at said second location an eccentric with a high part and a low part for removing said article from said second given place upon rotation thereof from a second predetermined position.

28. The apparatus of claim 27 characterized by said first and second predetermined positions being common to said rolls of said first and second groups and by said rolls of said first and second groups being positioned relative to each other so that at said first and second predetermined positions at one time there is a high part of said first and second eccentrics and a low part of the eccentric of the roll of said other of said two groups of rolls and at another time a low part of said first and second eccentrics and a high part of the eccentric of the rolls of said other of said two groups of rolls.

29. Elongated article handling apparatus for conveying at least one length of an elongated article to and from a plurality of stations comprising, at least first and second stations positioned laterally of said apparatus and in tandem with said first station in advance of said second station and substantially side by side, said apparatus comprising at least two pairs of rotatable rolls extending and arranged substantially transversely of said article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said rib on one roll of each pair being right-handed and said rib on the other roll being left-handed, said rolls consisting of two groups with all rolls having said right-handed rib being rotatable in one direction and forming a first group and with all rolls with said left-handed rib being rotatable in the opposite direction and forming a second group, in each of said two groups all rolls being rotatable substantially in unison, said rib on each roll of one of said first and second groups comprising at least first and second coaxial ribs each having substantially the same pitch and being arranged on the periphery of their roll so that turns of one are disposed intermediately of turns of the other, each roll of said one of said first and second groups comprising first and second segments, each of said first segments and their helical ribs extending from a position in advance of said two stations to a first location substantially in alignment with but laterally of said first station, each of said second segments and their helical ribs extending from said first location to a second location substantially in alignment with but laterally of said second station, each roll of said other of said first and second groups and its helical rib extending from said second location on past said second station, at each of said first and second locations at least two eccentric disks mounted upon rotatable shafts for rotation therewith, each of said disks being arranged substantially transversely of said article, being disposed in tandem and laterally of a pair of said rolls, having a low part below the tops of said rolls when in a first given position, said low part being adapted for receiving said article from said first segments as to those disks at said first location and from said second segments as to those disks at said second location, each disk also having a high part extending at least to the tops of said rolls when in a second given position, said high part being adapted to transfer said article onto said second segment as to those disks at said first location and onto said rolls of said other of said first and second groups, a driving connection between each of said shafts and one roll of a pair of rolls, said driving connection being such that said eccentric disks at each of said first and second locations rotate substantially in unison and rotate from said first given position to said second given position and then to said first given position upon a predetermined fraction of a revolution of said one roll of a pair of rolls.

30. The apparatus of claim 29 characterized by said rib on each roll of said other of said first and second groups comprising at least first and second coaxial ribs arranged similarly to those ribs of said one of said first and second groups.

31. Elongated article handling apparatus for conveying at least one length of an elongated article to and from a plurality of stations comprising, at least first and second stations positioned laterally of said apparatus and in tandem with said first station in advance of said second station and substantially side by side, said apparatus comprising at least two pairs of rotatable rolls extending and arranged substantially transversely of said article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article upon rotation thereof, said rib on one roll of each pair being right-handed and said rib on the other roll being left-handed, said rolls consisting of two groups with all rolls having said right-handed rib being rotatable in one direction and forming a first group and with all rolls with said left-handed rib being rotatable in the opposite direction and forming a second group, in each of said two groups all rolls being rotatable substantially in unison, each rib on each roll of one of said first and second groups comprising at least first and second coaxial ribs each having substantially the same pitch and being arranged on the periphery of their roll so that turns of one are disposed intermediately of turns of the other, each roll of said one of said first and second groups comprising first and second segments, each of said first segments and its helical ribs extending from a position in advance of said two stations to a first location substantially in alignment with but laterally of said first station, each of said second segments and their helical ribs extending from said first location to at least a second location substantially in alignment with but laterally of said second station, each roll of said other of said first and second groups and its helical rib extending from at least said second location on past said second station, at said first location at least two eccentric disks mounted upon rotatable shafts for rotation therewith, each of said disks being arranged substantially transversely of said article, being disposed in tandem and laterally of a pair of said rolls, having a low part below the tops of said rolls when in a given first position, said low part being adapted for receiving said article from said first segments, each disk also having a high part extending at least to the tops of said rolls when in a second given position, said high part being adapted to transfer said article onto said second segments, a driving connection between each of said shafts and one roll of a pair of rolls, said driving connection being such that said eccentric disks rotate substantially in unison and from said first given position to said second given position and then to said first given position upon a predetermined fraction of a revolution of said one roll of a pair.

32. The apparatus of claim 31 characterized by said rib on each roll of said other of said first and second groups comprising at least first and second coaxial ribs arranged similarly to those ribs of said one of said first and second groups.

33. The apparatus of claim 31 characterized by each second segment having a portion substantially at said second location for delivering said article to a place below the top of said segment and substantially at said second location upon rotation thereof to a predetermined position, said portion extending from a part of the periphery of its segment inwardly towards the longitudinal axis thereof and forming a continuation of the peripheral surface of its segment so that rotation thereof conveys said article to said place, each roll of said other of said first and second groups having a portion adjacent said second location for removing said article from said place upon rotation thereof from a predetermined position, said portion of said other rolls extending from a part of the periphery thereof inwardly towards the longitudinal axis thereof and towards said place and forming substantially a continuation of the peripheral surface thereof to convey said article from said place upon rotation thereof.

34. The apparatus of claim 33 characterized by each second segment having a second portion substantially similar to said first mentioned portion, substantially at said second location and on that side of said roll opposite said first mentioned portion.

35. Elongated article handling apparatus for conveying at least one length of an elongated article to and from a plurality of stations comprising, at least first and second stations positioned laterally of said apparatus and in tandem with said first station in advance of said second station and substantially side by side, said apparatus comprising at least two pairs of rotatable rolls extending and arranged substantially transversely of said article and of said stations and disposed in tandem, said rolls being drivingly connected to a source of power for rotating same about their longitudinal axes with said rolls of each pair connected for rotation in opposite directions to one another, each roll having an entry end and an exit end and a substantially continuous helical rib extending along at least a part of its length and running in a direction towards said exit end and common to all said rolls, said rolls being disposed to receive thereon and convey therealong said article with said ribs thereon arranged to engage and advance said article, said rib on one roll of each pair being right-handed and said rib on the other roll being left-handed, said rolls consisting of two groups with all rolls having said right-handed rib being rotatable in one direction and forming a first group and with all rolls with said left-handed rib being rotatable in the opposite direction and forming a second group, in each of said two groups all rolls being rotatable substantially in unison, said rib on each roll of one of said first and second groups comprising at least first and second coaxial ribs each having substantially the same pitch and being arranged on the periphery of their roll so that turns of one are disposed intermediately of turns of the other, each of said first ribs extending from a position in advance of said two stations to at least a first location substantially in alignment with but laterally of said first station, each of said second ribs extending from a position in advance of said two stations to a second location substantially in alignment with but laterally of said second station, said rib on each roll of said other of said first and second groups extending from said second location in a direction on past said second station so that upon rotation of said rolls of said other of said first and second groups, said ribs thereon move said article away from said second location and simultaneously laterally away from said second station, at said second location at least two eccentric disks mounted upon rotatable shafts for rotation therewith, each of said disks being arranged substantially transversely of said article, being disposed in tandem and laterally of a pair of said rolls, having a low part below the tops of said rolls when in a first given position, said low part being adapted for receiving said article from said one of said first and second groups, each disk also having a high part extending at least to the tops of said rolls when in a second given position, said high part being adapted to transfer said article onto said other of said first and second groups, a driving connection between each of said shafts and one roll of a pair of rolls, said driving connection being such that said eccentric disks rotate substantially in unison and from said first given position to said second given position and then to said given position upon a predetermined fraction of a revolution of said one roll of a pair.

36. The apparatus of claim 35 characterized by said rib on each roll of each other of said first and second groups comprising at least first and second coaxial ribs.

37. The apparatus of claim 35 characterized by each roll of said one of said first and second groups having a portion substantially at said first location for delivering said article to a place below the top of said roll of said one of said first and second groups and substantially at said first location upon rotation thereof to a predetermined position, said portion extending from a part of the periphery of its roll inwardly towards the longitudinal axis thereof and then away from said longitudinal axis back to its periphery, extending toward and away from said place and forming a continuation of the peripheral surface of its roll so that rotation thereof conveys said article to said place and so that further rotation thereof conveys said article from said place and away from said first station.

38. The apparatus of claim 37 characterized by each roll of said one of said first and second groups having a second portion substantially similar to said first mentioned portion, substantially at said first location and on that side of said roll opposite said first mentioned portion.

39. The apparatus of claim 38 characterized by said first coaxial rib of each roll of said one of said first and second groups running to said first portion and by said second coaxial rib of each roll of said one group running to said second portion.

40. Elongated article handling apparatus for conveying at least one length of an elongated article to and from a plurality of stations comprising at least first and second stations positioned laterally of said apparatus and in tandem with said first station in advance of said second station and substantially side by side, said apparatus comprising at least two pairs of rotatable rolls extending and arranged substantially transversely of said article and of said stations and disposed in tandem, said rolls being drivingly connected to a source of power for rotating same about their longitudinal axes with said rolls of each pair connected for rotation in opposite directions to one another, each roll having an entry end and an exit end and at least first and second coaxial substantially continuous helical ribs extending along at least a part of its length and running in a direction towards said exit end and common to all said rolls, said rolls being disposed to receive thereon and convey therealong said article with said ribs arranged to engage and advance said article upon rotation thereof, each of said two ribs on each roll having substantially the same pitch and being arranged on the periphery of their roll so that turns of one are disposed intermediately turns of the other, said ribs on one roll of each pair being right-handed and said ribs on the other roll of each pair being left-handed, said rolls consisting of two groups with all rolls having said right-handed ribs being rotatable in one direction and forming a first group and with all rolls with said left-handed ribs being rotatable in the opposite direction and forming a second group, in each of said two groups all rolls being rotatable substantially in unison, said first rib on each roll of one of said first and second groups extending from a position in advance of said two stations to at least a first location substantially in alignment with but laterally of said first station, said second rib on each roll of said one of said first and second groups extending from a position in advance of said two stations to at least a second location substantially in alignment with but laterally of said second station, said first rib on each roll of the other of said first and second groups extending at least from said first location in a direction on past said first and second stations, said second rib on each roll of the other of said first and second groups extending at least from said second location in a direction on past said second station.

41. The apparatus of claim 40 characterized by each roll of said one of said first and second groups having a first portion substantially at said first location for delivering a first article to a first place below the top of said roll of said one of said first and second groups and substantially at said first location upon rotation thereof to a first predetermined position and having a second portion substantially at said second location for delivering said article to a second place disposed similarly to said first place but substantially at said second location upon rotation thereof to a second predetermined position, said first portion extending from a part of the periphery of its roll inwardly towards the longitudinal axis thereof and then away from said longitudinal axis back to its periphery, extending towards and away from said first place and forming a continuation of the peripheral surface of its roll so that rotation of its roll conveys said first article to said first place, said second portion extending from a part of the periphery of its roll inwardly towards the longitudinal axis thereof, towards said second place and forming a continuation of the peripheral surface of its roll to convey a second article to said second place, each roll of said other of said first and second groups having a first portion substantially similar to said first mentioned first portion and disposed substantially at said first location for removing said first article from said first place upon rotation thereof, each roll of said other of said first and second groups also having a second portion substantially similar to said first mentioned second portion and disposed substantially at said second location for removing said second article from said second place upon rotation thereof.

42. The apparatus of claim 41 characterized by each of said first and second portions of said two groups of rolls being disposed on substantially the same side of their rolls so that said first and second portions reach said first and second locations respectively substantially simultaneously upon rotation thereto.

43. The apparatus of claim 41 characterized by each roll of said one of said first and second groups having a third portion substantially similar to said first portion of its roll, substantially at said first location and on that side of said roll opposite said first portion.

44. The apparatus of claim 43 characterized by said second rib of each roll of said one of said first and second groups running to said third portion.

45. The apparatus of claim 40 characterized by each roll of said first and second groups having at said first location a first eccentric and at said second location a second eccentric, each of said first and second eccentrics having a high part and a low part for bringing a first article into a first given place at said first location and a second article into a second given place at said second location upon rotation thereof to a first predetermined position, each roll of the other of said first and second groups having at said first location a first eccentric and at said second location a second eccentric, each of these last mentioned eccentrics having a high part and a low part for removing said first article from said first given place and for removing said second article from said second given place upon rotation thereof from a second predetermined position.

46. The apparatus of claim 45 characterized by said first and second predetermined positions being common to all of said rolls and by all of said rolls being positioned relative to each other so that at said first and second predetermined positions at one time there is a high part of said first and second eccentrics of said one of said first and second groups and a low part of the eccentrics of the other of said first and second groups and at another time a low part of said first and second eccentrics of said one of said first and second groups and a high part of the eccentrics of said other of said first and second groups.

References Cited in the file of this patent

UNITED STATES PATENTS 2,863,551     Bilocq _____ Dec. 9, 1958